United States Patent
Pacella et al.

(10) Patent No.: US 8,358,660 B2
(45) Date of Patent: Jan. 22, 2013

(54) METHOD AND SYSTEM FOR PROVIDING INTEGRATED CONTENT DELIVERY

(75) Inventors: Dante J. Pacella, Charles Town, WV (US); Norman Richard Solis, Fairfax, VA (US); Harold Jason Schiller, Silver Spring, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 12/619,263

(22) Filed: Nov. 16, 2009

(65) Prior Publication Data

US 2011/0116376 A1     May 19, 2011

(51) Int. Cl.
*H04L 12/56* (2006.01)

(52) U.S. Cl. .......... 370/396; 370/401; 370/419; 725/92; 709/203

(58) Field of Classification Search ................... 370/396, 370/401, 419; 709/203, 217; 725/92
See application file for complete search history.

(56) References Cited

U.S. PATENT DOCUMENTS

| | | | |
|---|---|---|---|
| 7,263,476 B1 * | 8/2007 | Dellacona | 703/13 |
| 7,801,118 B2 * | 9/2010 | Berman | 370/355 |
| 2007/0133609 A1 * | 6/2007 | Moore et al. | 370/484 |
| 2011/0035528 A1 * | 2/2011 | Hoese et al. | 710/315 |

* cited by examiner

*Primary Examiner* — Jianye Wu
*Assistant Examiner* — Wanda Z Russell (57) ABSTRACT

An approach is provided for integrated content delivery. A request for content stored on a disk array of a router is received. In response to the request, one or more disks of the disk array are selected to retrieve the content, wherein the disk array is natively coupled to a switch fabric of the router. A path is determined through the switch fabric for transmission of the content.

20 Claims, 5 Drawing Sheets

METHOD AND SYSTEM FOR PROVIDING INTEGRATED CONTENT DELIVERY

BACKGROUND INFORMATION

Consumer demand for high-quality, low-latency delivery of streaming multimedia and/or other rich digital content associated with services, such as interactive broadcasting, massively multiplayer online gaming, targeted advertisement insertion, video-on-demand, and the like, is increasingly motivating service providers to develop new, more diverse and complex broadband services. In general, however, service providers that compete to provide such content-based services within (or over) core networking infrastructures of, for example, the Internet, are struggling to meet the growing quality of service (e.g., guaranteed availability, high bit rate, low error probability, etc.) demands associated with these emerging services. Even though a few conventional approaches to providing such content-based services have surfaced, such as strategically located (e.g., geographically dispersed) content delivery networks (CDN), centralized CDN-like platform systems, etc., these approaches have merely alleviated the quality of service requirements and remain wrought with aggregately inefficient, high-cost, and scalably challenged solutions that are able to pacify, but unable to quench the ever growing consumer demand for more bandwidth, higher reliability, and feature rich content-based services.

Therefore, there is a need for an approach that can effectively and efficiently provide content delivery that is also capable of supporting a diversity of existing and emerging content-based services.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing integrated content delivery are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to particular content-based services over an Internet Protocol (IP) network, it is contemplated that various exemplary embodiments are applicable to other equivalent networking infrastructures.

Figure 1:
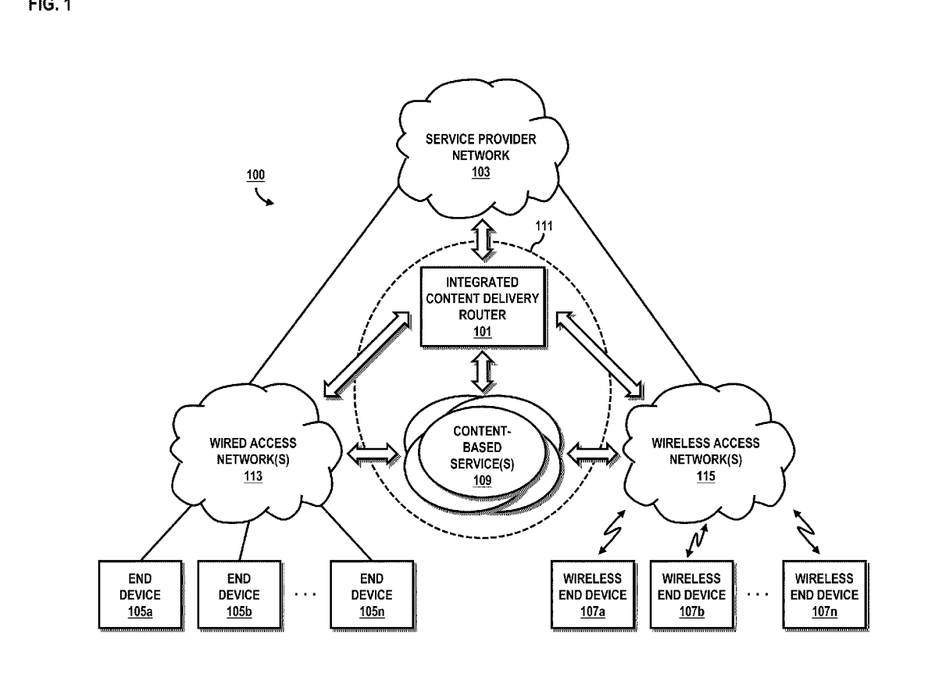
FIG. 1 is a diagram of a system for providing integrated content delivery, according to an exemplary embodiment.

FIG. 1 is a diagram of a system for providing integrated content delivery, according to an exemplary embodiment. For purposes of illustration, system 100 for providing integrated content delivery via integrated content delivery router 101 is described with respect to service provider network 103. Accordingly, it is contemplated that system 100 enables consumers to access via, for example, end devices 105a-105n and/or wireless end devices 107a-107n, one or more content-based services 109 made available over, for instance, the Internet 111 or any other suitable infrastructure. End devices 105a-105n access content-based services 109 via one or more wired access networks 113, whereas wireless end devices 107a-107n access content-based services 109 by way of one or more wireless access networks 115. In this manner, the actual content that is provided to consumers in association with content-based services 109 is stored at and delivered by integrated content delivery router 101. Even though only one integrated content delivery router 101 is illustrated, it is contemplated that any number of suitable content delivery routers may be provisioned to system 100. Further, integrated content delivery routers 101 may be provisioned as part of (or extensions to) one or more of networks 103 and 111-115. In this way, integrated content delivery routers 101 may be dedicated to or deployed in association with networks 103 and/or 111-115 and content-based services 109. While specific reference will be made hereto, it is contemplated that system 100 may embody many forms and include multiple and/or alternative components and facilities.

Traditionally, content delivery networks (CDN) have been utilized by service providers to deliver multiple types of content (e.g., audio, data, documents, objects, software, video, etc.) through multiple channels or mediums. In this manner, one or more content delivery platforms may be deployed to enable consumer access to this content, as well as enable service providers to monetize or charge for the storage, purchase, distribution, and/or use of the content or CDN resources. It is noted that a typical CDN may include a system of frontend computing devices (e.g., servers) having networked access to a plurality of backend storage area networks (SAN) that are geographically provisioned at various strategic locations to maximize the bandwidth effectively available to a concurrent clientele. That is, a CDN will seek to make multiple copies of available content as "close" as possible to the greatest amount of consumers so as to diminish the effects of bottlenecking and, thereby, increase throughput. In such arrangements, CDNs attempt to dynamically distribute assets at redundant core, fallback, and edge servers in hopes that associated content delivery platforms can locate, direct, and optimize consumer access to the content. Essentially, CDNs seek to leverage the summed capacity of dispersed storage and access resources, which may be, at times, greater that the capacity of backbone resources.

It is recognized, however, that CDN-based network traffic can consume a majority of the resources available to the core, fallback, and edge servers. As such, CDNs tend to consume large sums of both upstream and downstream bandwidth, which is especially true when network traffic patterns change or when content availability is unique. Further, CDNs diminish already squandering amounts of bandwidth when seeding remote SANs with content from other content vaults or even from content originators. Centrally concentrating content delivery into a platform of CDN servers may enable statistical multiplexing efficiencies and reduce numbers of routing chassis; however, it creates other inefficiencies. For instance, a conventional CDN platform may include numerous servers, such that when a service provider attempts to locate available content for delivery to a third-party (e.g., for content delivery to "external" parties, such as the consuming public) or for a first-party (e.g., content delivery to "internal" parties, such as between CDN stores), the concentration of servers results in inefficiencies across access port costs, heat generation and dissipation, content-location awareness, power consumption, and even stream replication, not to mention, results in bandwidth being inefficiently distributed among available delivery ports of disparate servers. From a management perspective, as CDNs increase in size and capacity, the number of individual components requiring monitoring and maintenance becomes unduly burdensome, not to mention vastly expensive. Moreover, upgrading CDNs may only require the addition of more "pizza box" style servers to increase storage capacity, concurrent processing capabilities, available networking ports, etc., but comes at the cost of increasing the number of necessary independent power feeds, content replications, and aggregate resource upgrades when, for instance, only a single dimension of the content delivery equation was being stressed, i.e., when only one or more of the storage capacity, concurrent processing capability, available networking ports, etc., needed attention.

Therefore, the approach of system 100, according to certain exemplary embodiments, stems from the recognition that by natively integrating one or more SAN-type disk arrays, one or more blade center processing racks, one or more service-specific application cards, and a multi-chassis routing interface into an integrated content delivery router capable of storing, streaming, and delivering content enables service providers to leverage common router assets, as well as reduce processing times for content location and retrieval since the router components are natively coupled amongst one another via a common native switch fabric. In this manner, integrated content delivery routers enable economies of scope, as well as enable the flexibility to offload non-streaming functions to other networking nodes and, thereby, facilitate economics of scale too. Other exemplary embodiments stem from the recognition that by providing a blade-style infrastructure, service providers can independently upgrade (or otherwise modify) integrated content delivery router functions and/or resources by simply adding, removing, or customizing blades (or blade configurations) for additional storage capacity, concurrent processing capability, available content-based applications, and/or available networking interfaces. Still further, such a unified structure enables service providers to lease "virtually" partitioned or even shared resources of an integrated content delivery router to other CDN suppliers or networks and, thereby, create new sources of revenues in an already highly competitive marketplace. In this manner, service providers may further create unique service environments (USE) to optimize resource utilization and, thereby, avoid resource contention between USEs provisioned to a particular integrated content delivery router, such as with regard to bandwidth, routing, storage capacity, content-based service sessions, control plane functions, etc. Further, since the resources of an integrated content delivery router may be "virtualized," it is contemplated that these virtualized resources may be allocated (or otherwise partitioned) among and between USEs in any suitable manner, e.g., evenly, constantly, variably, or otherwise distributed. As such, certain embodiments also enable the allocation of virtualized resources to be statically and/or dynamically assigned, such as in accordance with one or more predefined service level agreements, based on a dynamic or historical assessment of consumed and, thereby, available resources, made contingent upon a policy of a network service provider, and/or provisioned in relation to any one or more other suitable metrics, parameters, policies, etc. Additionally (or alternatively), the virtualized resources may also be allocated or re-allocated in an "on-demand" fashion. Accordingly, integrated content delivery routers can be used to serve both first-party content demands, as well as leased to third-party content suppliers enabling virtual collocation at much more efficient cost-per-bit technologies.

According to exemplary embodiments, content-based services 109 enable consumers via, for example, end devices 105a-105n and wireless end devices 107a-107n to request, access, and obtain content delivered from integrated content delivery router 101 in one or more media or multimedia formats, such as one or more audio, datacast, textual, video, etc., formats. For instance, video media may be encoded in a Real format, a motion pictures group (MPG) format, a windows media format, or other video codec or format. Content accessed and obtained as audio media, such as in one or more music tracks or broadcast recordings may be encoded in a motion pictures expert group (MPEG) audio layer (MP) format, waveform audio (WAVE) format, RealAudio format, or other audio codec or format. Content accessed and/or obtained as datacast contents may be encoded as joint photographic experts groups (JPEG) files, portable network graphics (PNG) files, hypertext markup language (HTML) files, etc. In this manner, content-based services 109 may provide various services, such as television and/or radio broadcasting, audio and/or video-on-demand streaming, targeted advertisement insertion, online game rendition, news reporting, stock quotations, sports scoring, weather reporting, deep-packet inspection services, general dynamic web content publishing, and the like.

As such, service provider network 103 enables end devices 105a-105n and wireless end devices 107a-107n to request and receive (or retrieve) content from integrated content delivery router 101 via one or more of networks 111-115. As previously mentioned, one or more integrated content delivery routers 101 may be provisioned as part of one or more of networks 103 and/or 111-115 and, thereby, made available to end devices 105a-105n and wireless end devices 107a-107n to request and receive (or retrieve) content therefrom. While not necessary, this can enable the "shortening" of delivery distances between integrated content delivery routers 101 and end devices 105a-105n and wireless end devices 107a-107n. Networks 103 and 111-115 may be any one or more suitable wireline and/or wireless networks, which may be owned and operated by one or more network service providers or privately associated with any suitable third-party (e.g., business, corporation, government, institution, organization, etc.). For example, networks 103 and 111-115 may include circuit-switched networks, such as the public switched telephone network (PSTN), an integrated services digital network (ISDN), a private branch exchange (PBX), or other like network. Networks 103 and 111-115 may employ various wireless access technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), or other suitable cellular/radio networks, etc., as well as any other suitable wireless medium, e.g., microwave access (WiMAX), wireless fidelity (WiFi), satellite, and the like. Furthermore, networks 103 and 111-115 may embody or include any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 103 and 111-115 may be completely or partially contained within one another, or may embody one or more of the aforementioned infrastructures. For instance, service provider network 103 may embody circuit-switched and/or packet-switched networks that include facilities to provide for transport of circuit-switched and/or packet-based communications. It is further contemplated that networks 103 and 111-115 may include components and facilities to provide for signaling and/or bearer communications between the various components or facilities of system 100. In this manner, networks 103 and 111-115 may embody or include portions of a signaling system 7 (SS7) network, or other suitable infrastructure to support control and signaling functions. As such, the conjunction of networks 103 and 111-115 may be adapted to facilitate content delivery in support of content-based services 109 via one or more integrated content delivery routers 101.

According to exemplary embodiments, end devices 105a-105n and wireless end devices 107a-107n may include any wired or wireless-based customer premise equipment (CPE) capable of sending and/or receiving information over one or more of networks 103 and/or 111-115. For instance, end devices 105a-105n may be any suitable plain old telephone service (POTS) device, facsimile machine, etc., or suitable computing device, such as a VoIP phone, skinny client control protocol (SCCP) phone, session initiation protocol (SIP) phone, IP phone, personal computer, softphone, workstation, terminal, server, etc. Wireless end-devices 107a-107n may be any cellular phone, radiophone, satellite phone, smart phone, wireless phone, or any other suitable mobile device, such as a personal digital assistant (PDA), laptop, pocket personal computer, tablet, customized hardware, etc. Even though only a limited number of end devices 105a-105n and wireless end devices 107a-107n are illustrated, it is contemplated that system 100 can support any suitable number of devices 105a-105n and 107a-107n.

Accordingly, integrated content delivery router 101 may be configured to receive requests for content from one or more of end devices 105a-105n, wireless end devices 107a-107n, and/or content-based services 109. These requests may be received in any suitable request format, such as one or more packetized formats or any other unit of transmission format capable of being transported over one or more of networks 103 and/or 111-115. It is noted that the requests seek content that is, for example, stored on one or more disk arrays (not shown) of integrated content delivery router 101 that are natively coupled to a switch fabric (not illustrated) of integrated content delivery router 101. Accordingly, integrated content delivery router 101 may be configured to select, in response to received requests, one or more particular disks (not illustrated) of these disk arrays in order to retrieve the content, process and encode the content for delivery over one or more of networks 103 and 111-115, as well as determine paths through the switch fabric of integrated content delivery router 101 for transmitting the content to requesting destinations, e.g., end devices 105a-105n, wireless end devices 107a-107n, and/or content-based services 109.

As will become more apparent below, integrated content delivery router 101 may, according to various exemplary embodiments, include one or more components configured to manage, maintain, and terminate one or more content-based streaming (or otherwise transmitting) sessions, determine optimal routes (or paths) for retrieving and/or delivering content, optimize networking resources (e.g., bandwidth consumption across and among transmission sessions, networking port exhaustion, processing loads, power efficiencies, etc.), perform efficient content storage and replication processes, and/or execute one or more of the processes described herein. Further, the various components of integrated content delivery router 101 may be individually upgraded, configured, and optimized.

According to other exemplary embodiments, the various resources of integrated content delivery router 101 may be logically partitioned between providers of content-based services 109, between types of content-based services 109, between scopes or functions of integrated content delivery router 101, or any other suitably divisible unit. In this manner, a service provider of integrated content delivery router 101 may be able to create one or more unique service environments (USE) that may be monitored so that integrated content delivery router 101 may avoid resource contention between provisioned USEs and, thereby, optimize bandwidth consumption, routing interfaces utilization, disk storage depletion, streaming session count balancing, control plane signaling, and like. Such logical divisions may also be utilized to deploy and lease virtual "resources" of integrated content delivery router 101 to third-party content providers, which enables these third-party content providers to operate in one or more content ownership roles, content broker roles, content wholesaling roles, and the like. As previously mentioned, the virtualized resources of integrated content delivery routers 101 may be allocated (or otherwise partitioned) amongst and between USEs in any suitable manner, e.g., evenly, constantly, variably, or otherwise distributed. Such allocations may further be statically and/or dynamically assigned, such as in accordance with one or more predefined service level agreements, based on a dynamic or historical assessment of consumed and, thereby, available resources, made contingent upon a policy of a network service provider, and/or provisioned in relation to any one or more other suitable metrics, parameters, policies, etc. Additionally (or alternatively), the virtualized resources may be allocated and re-allocated in an "on-demand" fashion. Further, the leasing abilities of the virtualized resources of integrated content delivery routers 101 enable a service provider to further monetize content-based delivery services. It is noted that exemplary configurations for integrated content delivery router 101 are described in more detail in accordance with FIGS. 2 and 3.

Figure 2:
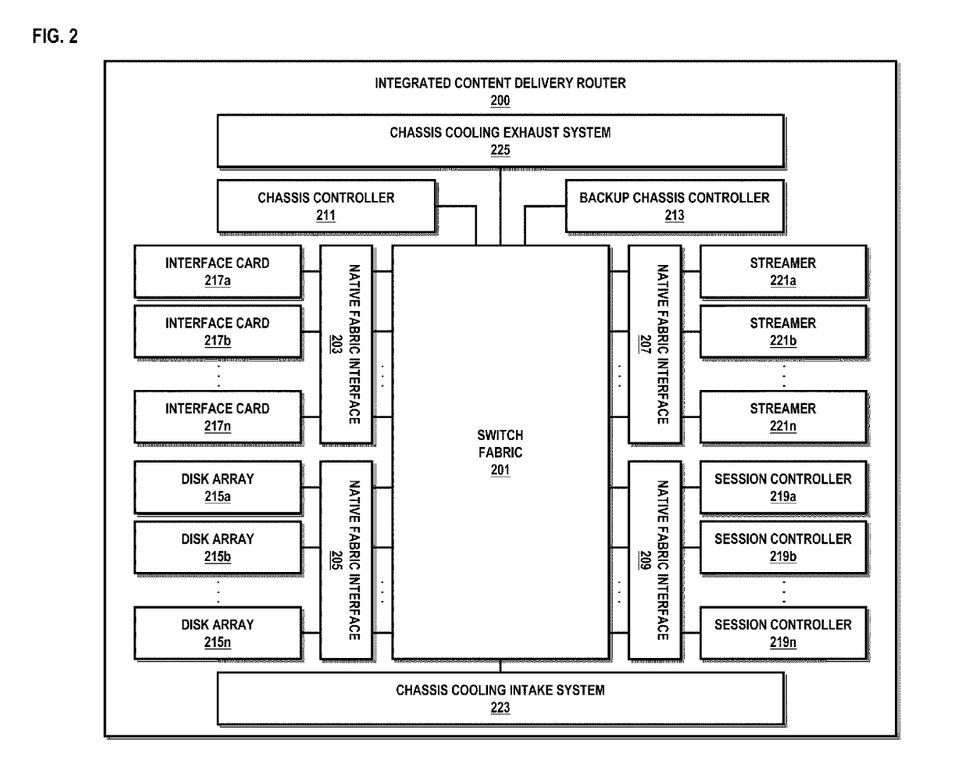
FIG. 2 is a diagram of an integrated content delivery router, according to an exemplary embodiment.

FIG. 2 is a diagram of an integrated content delivery router, according to an exemplary embodiment. For descriptive purposes, integrated content delivery router (or router) 200 is described with respect to receiving requests and streaming (or otherwise transmitting) content in units of packets, however, other suitable transfer schemes or units of transmission may be utilized. In this manner, router 200 may comprise computing hardware (such as described with respect to FIG. 5), as well as include one or more components configured to execute the processes described herein for integrated content delivery. Furthermore, it is contemplated that the components of router 200 may be combined and/or separated into one or more multi-chassis configurations, such as will become more apparent in the description of FIG. 3.

As shown in FIG. 2, router 200 includes a plurality of integrated components natively coupled amongst one another via a common switch fabric 201 and, thereby, are configured to operate as a single router capable of storing, processing, and delivering content in support of one or more content-based services, such as one or more of the previously mentioned content-based services of content-based services 109. According to exemplary embodiments, the various components of router 200 comprise removable "blades" of a rackmountable chassis system. In this manner, switch fabric 201 may be physically integrated into one or more chassis structures of router 200, such as a backplane, mid-plane, sideplane, or the like, of router 200. Individual component blades of router 200 may be "hot-pluggable" and/or "hot-swappable" in various preconfigured blade slots (or connection receptacles) of router 200. As such, component blades may be natively coupled (e.g., physically coupled) to switch fabric 201 through one or more native fabric (or physical plug-in) interfaces 203, 205, 207, and 209 of switch fabric 201. Native fabric interfaces 203-209 enable components of router 200 to effectively form a physically coupled internalized local area network (LAN) that is configured to support integrated content delivery via system 100. It is noted that component blades of router 200 may include standalone control, power, communication, and/or cooling features and functions, which may be configured to operate in conjunction with (or supplanted by) overall chassis control, power, communication, and/or cooling features and functions. This configuration, while not necessary, enables blade components to be individually added and/or removed, as well as enables service providers to independently upgrade certain features and functions without having to upgrade or address other features or functions.

According to exemplary embodiments, switch fabric 201 may be single or multi-staged, as well as configured to include one or more dedicated interconnects (or paths) between various components of router 200, the purpose of which will become more apparent below. It is further noted that interconnections of switch fabric 201 may be multiplexed. Switch fabric 201 may operate via any suitable switch fabric interface, such as 10 gigabit media independent interface (XAUI), peripheral component interconnect express (PCI-E), advanced switching, serial rapid input/output, or any other suitable or proprietary switch fabric protocol, such as other high-speed backplane protocols. Moreover, switch fabric 201 may provide non-blocking connectivity amongst components of router 200 so that, for example, "N" inputs to switch fabric 201 may be interconnected with "N" outputs via any combination of paths, which effectively enables pathways to be formed through switch fabric 201 that interconnect any particular input and any particular output. Non-blocking connectivity of switch fabric 201 further enables chassis control (or central intelligence functions) to be abstracted and, thereby, enabled to exist on any one or more of the component blades of router 200 or, as shown in FIG. 2, to be aggregated at, for example, chassis controller 211. Additionally or alternatively, each of the various components of router 200 may include a local controller (not shown) that interacts with chassis controller 211 and, thereby, provides chassis controller 211 with various control information (e.g., configuration data, operational state, forwarding information, commands, instructions, etc.) regarding the respective component(s) for which the local controllers manage. Alternatively, separate or integrated controllers may be executed on each of the components of router 200. Accordingly, these controllers may utilize the various control information available to router 200 to optimize bandwidth consumption amongst networking ports, optimizing content processing tasks amongst controllers, processors, streamers, etc., process load balancing, optimize power consumption, determine shortest content delivery routes, as well as perform other suitable optimization tasks.

Accordingly, chassis controller 211 may be configured to control the various components of router 200, as well as control packet forwarding throughout router 200. It is noted that router 200 may also include one or more backup chassis controllers 213 for redundant and/or resilient operation; however, backup chassis controller(s) 213 may function similarly to chassis controller 211 and, therefore, are not explained in any further detail. In certain implementations, chassis controller 211 may share control plane information amongst and between the components of router 200 via interconnections of switch fabric 201. For example, chassis controller 211 may communicate (or otherwise exchange) routing information, state information, configuration data, load balancing information, available resource information, and/or other information via switch fabric 201 in order to facilitate and optimize integrated content delivery processes. It is noted that the routing information may include route data that describes various routes through networks 103 and 111-115 to particular end destinations, such as content-based services 109, end devices 105a-105n, and/or wireless end devices 107a-107n, as well as next hop route data indicating neighboring devices (e.g., routers, switches, or other networking nodes) of networks 103 and 111-115 for realizing shortest path routes. As such, chassis controller 211 may update routing information (such as periodically, continually, in response to configuration changes, in an on-demand fashion, or any in any other suitably scheduled or randomized fashion) so as to reflect a "current" and "optimized" network topology of system 100.

In certain embodiments, chassis controller 211 may utilize routing information to determine forwarding information (or paths) through switch fabric 201 for enabling content stored to one or more disks (not shown) of disk arrays 215a-215n to be streamed (or otherwise transmitted) to end devices 105a-105n, wireless end devices 107a-107n, content-based services 109, other integrated content delivery routers (not shown), etc., via one or more input/output ports (not illustrated) of interface cards (IFC) 217a-217n. According to certain exemplary embodiments, disk arrays 215a-215n may be configured to each store one instance of particular content intended for distribution in association with content-based services 109, which may be aggregated at a particular disk of a particular disk array or may be stripped across one or more disks of a particular disk array. While not necessary, such storage methodology avoids unnecessary content replication of the same data across numerous volumes present at a same physical location and/or avoids routers 200 having to be configured for content location awareness features that, in turn, circumvent processes whereby router 200 has to redirect content requests to other integrated content routers having the requested content. Further, disk arrays 215a-215n may store catalogs of related content, which may be stored in association with target identifiers and/or behavioral keyword mappings, such as for utilization in targeting advertisements to consumers based on, for instance, primary content streams (e.g., video broadcast) already being received by these consumers. It is further noted that disk arrays 215a-215n may be natively coupled to switch fabric 201 via native fabric interface 205.

According to certain exemplary embodiments, chassis controller 211 may also provide forwarding information to the various components of router 200 so that the components may exchange information, control commands, or other data, as well as send and/or receive packets over one or more of networks 103 and 111-115. It is noted that switch fabric 201 may include one or more dedicated paths (or interconnects) for the exchange of routing information between components so that, for example, primary content delivery functions of router 200 will not be hindered in the process of exchanging routing information and/or control information. In a similar fashion, content replication processes (and associated information exchange) and/or content storage/delivery processes (and associated information exchange) may traverse dedicated paths of switch fabric 201 so that content preparation (e.g., encoding, decoding, encryption, decryption, etc.), content streaming (or transmission), and content maintenance (e.g., content replication, modification, relocation, etc.) tasks will not hinder the other tasks.

As previously mentioned, router 200 includes one or more interface cards (IFC) 217a-217n that are configured to enable router 200 to send packets over and receive packets from networks 103 and 111-115. These packets may embody control information, routing information, a request for content, a stream of content, or any other suitable form (or type) of network traffic. Accordingly, packets (or other units of transmission) may be capable of fixed and variable lengths depending on the configuration of router 200 and/or system 100. In this manner, router 200 may be configured to exchange packets in fixed or variable lengths only or both fixed and variable lengths. At any rate, IFCs 217a-217n may be configured to route packets on a data plane of router 200 using, for example, one or more optical interconnects of switch fabric 201; however, it is contemplated that switch fabric 201 may utilize any other (or combination of) physical transport (or switching) mediums. Control plane communications between IFCs 217a-217n may also occur via interconnects of switch fabric 201. As shown, IFCs 217a-217n natively couple to switch fabric 201 via native fabric interface 203.

To manage content transmission sessions over one or more of networks 103 and/or 111-115, router 200 may also include one or more session controllers 219a-219n natively coupled to switch fabric 201 via native fabric interface 209. Accordingly, session controllers 219a-219n are configured to terminate content delivery sessions serviced by, for example, streamer cards 221a-221n or any other suitable content-based application service or monitoring card, e.g., targeted advertisement insertion cards, online gaming rendition cards, deep packet inspection (DPI) cards, broadcasting cards, etc. In this manner, router 200 may effectively serve as one or more of content-based services 109. That is, the traditional features and functions of conventional content-based service 109 may be assumed by router 200 or may be divided between router 200 and content-based service 109. According to exemplary embodiments, streamer cards 221a-221n may be configured to support streaming content according to various protocols, such as the user datagram protocol (UDP), real-time streaming protocol (RTSP), real-time transport protocol (RTP), real-time transport control protocol (RTCP), hypertext transmission protocol (HTTP), transmission control protocol (TCP), unicast protocols, multicast protocols, internet protocol multicast protocols (e.g., internet group management protocol (IGMP)), peer-to-peer protocols, etc. Streamer cards 221a-221n are natively coupled to switch fabric 201 via native fabric interface 207.

Even though not illustrated, the various components of router 200 may be supported within a chassis comprised of any one or more suitable materials for providing a rigid structure in which to support and protect the various components of router 200. The chassis structure of router 200 may also serve as a shield against undesirable environmental "noises," such as electrical noises, stray optic signals, mechanical vibrations, etc. According to certain embodiments, router 200 may also include a chassis cooling intake system (or system) 223 and a chassis cooling exhaust system (or system) 225 to provide, for instance, air circulation and, thus, forced convective cooling effects. Systems 223 and 225 may be controlled via chassis controller 211 so as to manage ambient conditions within router 200 and among the various components of router 200. Chassis controller 211 may, thereby, be able to control, monitor, and/or maintain certain temperatures, air flows, etc., within and about router 200. Router 200 may also have one or more power supplies (not shown), which may be disposed within the chassis structure of router 200, and may serve to convert and/or transform alternating current power into one or more direct current voltages for use by the various components of router 200. It is further noted that such power supplies may also be natively coupled to switch fabric 201 for power distribution purposes.

According to particular embodiments, chassis controller 211, along with information stored to one or more of disk arrays 215a-215n, may be configured to facilitate USE management tasks, which may be performed on either a per USE basis, such as by one or more service providers (or users) associated with a content-based service(s) provisioned to a particular USE, or may be aggregately performed, such as by a service provider of router 200 to manage router 200 or one or more USEs provisioned to router 200. In this manner, chassis controller 211 may be configured to provide a portal interface, such as a web or otherwise networked interface, that enables local or remote access to router 200 and USE management tasks of router 200, such as for configuring a content-based service, uploading, downloading, and/or modifying content stored to one or more of disk arrays 215a-215n, monitoring performance and resource usage of one or more USEs, etc. In certain embodiments, the portal interface may be provided in the form of one or more graphical user interfaces (GUI) configured with one or more menus of options to enable users to interface with router 200 and perform one or more USE management tasks.

It is noted that the portal interface may be dynamically generated by chassis controller 211 or stored to one or more of disk arrays 215a-215n and, as such, implemented by chassis controller 211. However, it is also contemplated that another facility or component of system 100, such as a frontend, middleware, or backend server (not shown), may be deployed to provide the portal interface and, thereby, configured to engage with router 200 to facilitate USE management tasks. Accordingly, end devices 105a-105n or wireless end devices 107a-107n may be utilized to access the portal interface over one or more of networks 103 and/or 111-115 and, thereby, access the USE management features and functionalities. Still further, an interfacing application may be additionally (or alternatively) implemented on one or more of end devices 105a-105n or wireless end devices 107a-107n and, thereby, configured to interface with router 200 to provide the USE management tasks. As such, certain other embodiments may enable chassis controller 211, end devices 105a-105n, and/or wireless end devices 107a-107n to function in conjunction with one another to provide a portal interface and/or USE management features and functionalities.

According to certain embodiments, USE management tasks may be provided to users according to one or more policies governing access to and configuration of the resources of router 200 and/or settings, parameters, options, etc., associated with a particular USE. In this manner, an individual user associated with a particular USE may be granted limited (or otherwise selective) access and configuration rights to engage with those content-based services corresponding to the particular user and/or USE, as well as to those resources allotted to the accessible and configurable USE. Of course, it is also contemplated that complete access and configuration rights may be granted to certain users, such as network administrators charged with managing router 200 and/or the USEs provisioned to router 200.

In order to provide the selective access and configuration rights, chassis controller 211 may also include (or have access to) an authentication module (not illustrated) for authenticating (or authorizing) users to router 200. It is contemplated that the authentication module may operate in concert with the portal interface. That is, the portal interface and the authentication module may operate in conjunction with one another to verify user provided credential information acquired from a particular user against corresponding credential information stored within a user profile of, for instance, one or more of disk arrays 215a-215n or any other suitable memory or storage location of or accessible to router 200. By way of example, the credential information may include "log on" information corresponding to a user name, password, coded key, or other unique identification parameter, such a personal identification number (PIN). In other instances, the credential information may include any one or combination of a birth date, an account number (e.g., bank, credit card, billing code, etc.), a social security number (SSN), an address (e.g., work, home, internet protocol (IP), media access control (MAC), port, etc.), or telephone listing (e.g., work, home, cellular, etc.), as well as any other form of uniquely identifiable datum, e.g., biometric code, voice print, etc. Users may provide this information via end devices 105a-105n and/or wireless end devices 107a-107n, such as by spoken utterances, dual-tone multi-frequency (DTMF) signals, packetized transmissions, etc. It is contemplated that unobtrusive security may be provided by positively identifying and screening users based on one or more of the aforementioned credentials which may be seamlessly provided when end devices 105a-105n and wireless end devices 107a-107n communicate with the portal interface, such as based on a unique IP or MAC address, voice print, or any other suitable unobtrusive measure.

According to certain other embodiments, selective access and configuration rights may be further realized through one or more physical and/or virtualized sub-controllers (not shown) of router 200. In this manner, individual users may be authorized (via, for instance, the portal interface and/or authentication module) to a particular sub-controller that may be provided with a limited ability to control router 200 and/or particular USEs provisioned to router 200.

Figure 3:
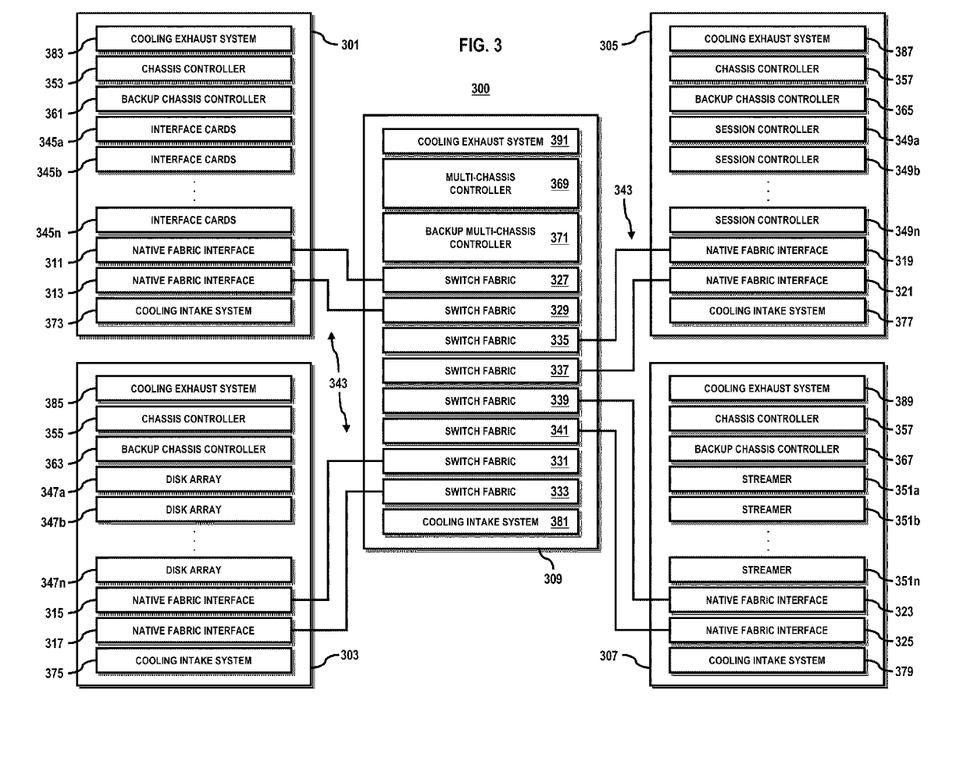
FIG. 3 is a diagram of a multi-chassis integrated content delivery router, according to an exemplary embodiment.

As previously mentioned, router 200 may also be provided in a multi-chassis configuration. FIG. 3 is a diagram of a multi-chassis integrated content delivery router, according to an exemplary embodiment. In this example, the various components of multi-chassis integrated content delivery router (or multi-chassis router) 300 operate similarly to corresponding components of router 200 and, therefore, the functioning of similar components are not further explained. In the illustrated embodiment, however, the various components of router 200 may be separated into one or more dedicated chassis, such as IFC chassis 301, disk array chassis 303, session controller chassis 305, streamer (or content-based service application) chassis 307, and switch fabric chassis 309. Accordingly, chassis 301-309 may be natively coupled via one or more corresponding native fabric interfaces 311, 313, 315, 317, 319, 321, 323, and 325 that may be interfaced with corresponding switch fabrics (e.g., switch fabric blades) 327, 329, 331, 333, 335, 337, 339, and 341 of switch fabric chassis 309. Native fabric interfaces 311-325 may be physically coupled to switch fabrics 327-341 via one or more optical interconnects 343 or other suitable physical transport media. In such an arrangement, it is to be appreciated that multi-chassis router 300 still operates and functions as a single router and is accordingly viewed by bordering networking nodes (e.g., other routers, switches, etc.) as a single routing entity.

According to exemplary embodiments, interface card chassis 301 includes a plurality of IFCs 345a-345n that operate similarly as IFCs 217a-217n, disk array chassis includes a plurality of disk arrays 347a-347n that operate similarly to disk arrays 215a-215n, session controller chassis 305 includes a plurality of session controllers 349a-349n that operate similarly to session controllers 219a-219n, and steamer chassis 307 includes a plurality of streamer cards 351a-351n that operate similarly to streamer cards 221a-221n. It is further noted that chassis 301-307 may include respective local chassis controllers 353, 355, 357, and 359 and local backup chassis controllers 361, 363, 365, and 367 that may operate alone or in conjunction with a master multi-chassis controller 369 that may be backed up via backup multi-chassis controller 371. It is also noted that the multi-chassis configuration of multi-chassis router 300 enables central control and intelligence to be abstracted and, thereby, made available at any one of the various components of multi-chassis router 300. Moreover, chassis 301-309 may include corresponding chassis cooling intake systems 373, 375, 377, 379, and 381 that function similar to chassis cooling intake system 223 and respective chassis cooling exhaust systems 383, 385, 387, 389, and 391 that function similar to chassis cooling exhaust system 225.

Figure 4:
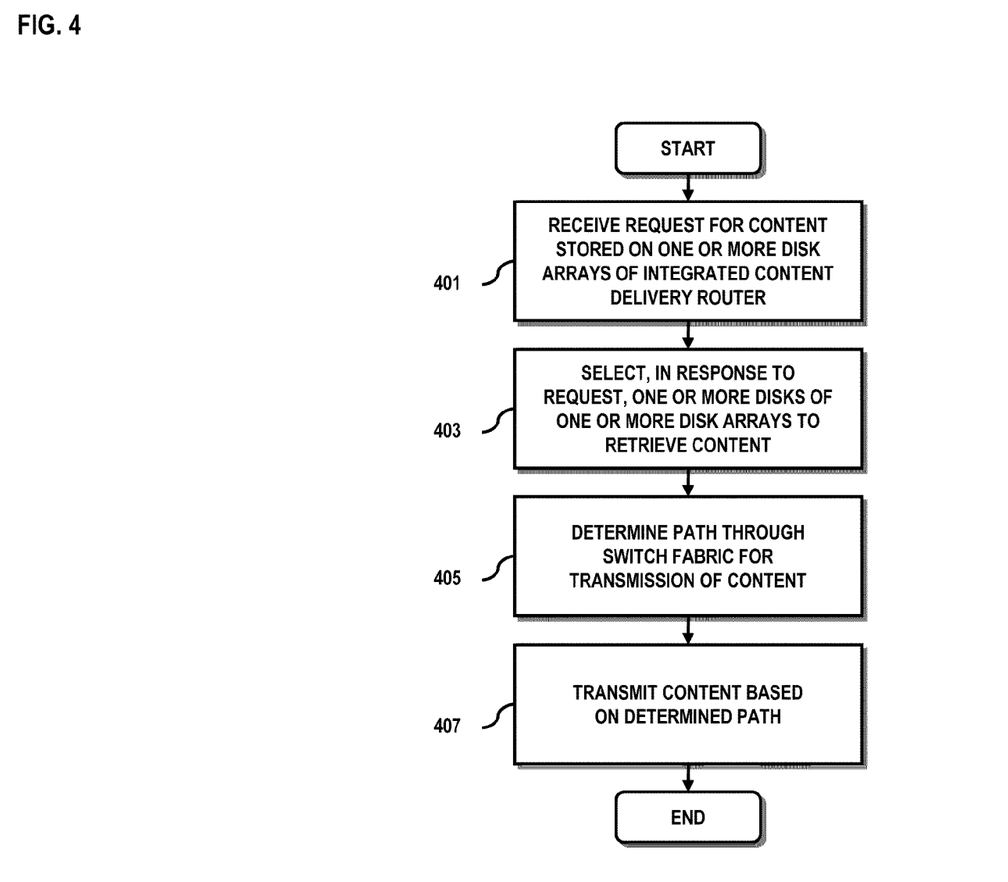
FIG. 4 is a flowchart of a process for integrated content delivery, according to an exemplary embodiment.

FIG. 4 is a flowchart of a process for integrated content delivery, according to an exemplary embodiment. For illustrative purposes, the process is described with reference to FIGS. 1 and 2. It is further noted that the steps of the process may be performed in any suitable order and/or combined in any suitable manner. In step 401, router 200 receives a request for content at IFC 217n that is stored on, for example, one or more disk arrays (e.g., disk array 215a) of router 200. The request may be embodied as one or more incoming packets received at IFC 217n that is forwarded to, for example, chassis controller 211 via switch fabric 201. As previously noted, disk array 215a and IFC 217n are natively coupled to switch fabric 201 via native fabric interfaces 205 and 203. In response thereto, chassis controller 211 may select (at step 403) one or more particular disks of disk array 215a (or of one or more of disk arrays 215a-215n) to retrieve the content. This selection may be based on one or more criteria, such as other content requests being serviced by disk arrays 215b-215n, overall disk array usage, shortest path retrieval through switch fabric 201, disk array state information, power consumption statistics associated with disk arrays 215a-215n and/or any other suitable parameter. In performing this selection, chassis controller 211 may also provide control information to one or more session controllers (e.g., session controller 219b) to establish a content-delivery session to, for instance, end device 105n and other control information to one or more of streamers 221a-221n (e.g., streamer 221a) for encoding content retrieved from the one or more disks of the one or more disk arrays 215a-215n for transmission via the content delivery session. It is noted that this control information may be passed between chassis controller 211, session controller 219b, and streamer 221a via switch fabric 201, whereby session controller 219b and streamer 221a are natively coupled to switch fabric 201 via native fabric interfaces 209 and 207. As such, switch fabric 201 may forward the content retrieved from the one or more disks of the one or more disk arrays 215a-215n to one or more of streamers 221a-221n (e.g., streamer 221a) for encoding before transmission via an initiated content-delivery session. Per step 405, chassis controller 211 may, via routing data, next hop data, and optimization parameters, determine a path through switch fabric 201 for transmission of the requested content to end device 105n via, for instance, wired access network 113.

That is, chassis controller 211 determines one or more switch configurations and switch interconnections through switch fabric 201 that natively couples utilized streamers (e.g., streamer 221a) to intended output IFCs (e.g., IFC 217b) so that encoded content therefrom may be forwarded to the output IFCs for transmission to end device 105n. Thus, at step 407, the content is transmitted (e.g., streamed) to end device 105n based on the determined path and/or routing information provided to output IFCs (e.g., IFC 217b) via chassis controller 211.

The processes described herein for providing integrated content delivery may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
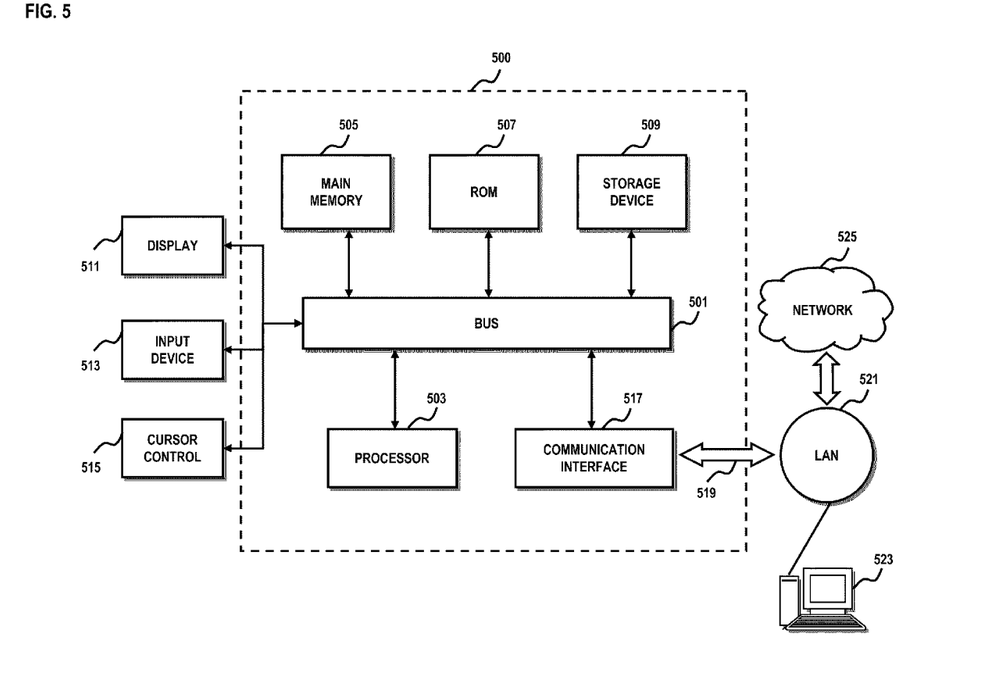
FIG. 5 is a diagram of a computer system that can be used to implement various exemplary embodiments.

FIG. 5 illustrates computing hardware (e.g., computer system) 500 upon which exemplary embodiments can be implemented. At the outset, it is noted that even though only certain numbers (or instances) of the various components of computer system 500 are illustrated, it is contemplated that computer system 500 may include any suitable number of these components, such as in multi-core, multi-processor based computing systems, multiple and/or redundant storage based computing systems, etc. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to an exemplary embodiment, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement exemplary embodiments. Thus, exemplary embodiments are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an exemplary embodiment through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave. Accordingly, processor 503 may be accessed and/or configured via any suitable local and/or remote session, such as a remote session established via network link 519. In this manner, one or more management protocols, e.g., extensible markup language (XML) based protocols, simple network management protocol (SNMP), etc., interactive commands, preloaded configuration files, etc., may be used to engage and configure computer system 500.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving a request for content stored on one or more disk arrays of a content delivery router for a content delivery network;
   selecting, in response to the request, one or more disks of the disk arrays from which to retrieve the content; and
   determining one or more paths through a common switch fabric of the router for transmission of the content,
   wherein the one or more disk arrays are natively coupled to the common switch fabric via one or more native fabric interfaces, forming a physically coupled internalized local area network,
   wherein, through the native coupling, the router, comprising at least one controller, operates as a single integrated content delivery routing entity, and
   wherein the content delivery router supports one or more unique service environments, whereby one or more sub-controllers of the router provide for selective access and configuration by authorized users for the one or more unique service environments.

2. A method according to claim 1, further comprising:
   initiating, at the router, one or more content streaming sessions in response to the request; and
   causing the content to be transmitted as part of the one or more content streaming sessions based on the one or more determined paths.

3. A method according to claim 2, further comprising:
   encoding the content at the router before transmission as part of the one or more content streaming sessions.

4. A method according to claim 1, wherein the one or more paths are determined based on information relating to one or more of available bandwidth, load balancing, and shortest delivery path.

5. A method according to claim 1, wherein resources of the router are logically partitioned into a plurality of unique service environments and the one or more paths are determined to prevent resource contention between the plurality of unique service environments.

6. A method according to claim 5, wherein the resources are leased to the unique service environments.

7. A method according to claim 1, wherein the one or more disks are selected based on disk usage information.

8. A method according to claim 1, wherein the content relates to one of video content, targeted advertisement content, gaming content, or deep packet inspection content.

9. A method according to claim 8, wherein video content is stored one per disk array of the router.

10. An apparatus comprising:
    a common switch fabric;
    one or more disk arrays natively coupled to the common switch fabric via one or more native fabric disk interfaces; and
    at least one controller, natively coupled to the common switch fabric via one or more native fabric controller interfaces, the at least one controller being configured to receive a request for content stored within the disk arrays, to select, in response to the request, one or more disks of the disk arrays from which to retrieve the content, and to determine one or more paths through the switch fabric for transmission of the content;
    wherein the native coupling of the common switch fabric, the one or more disk arrays and the at least one controller forms a physically coupled internalized local area network within the apparatus, whereby the apparatus operates as a single integrated content delivery routing entity for a content delivery network; and
    wherein the content delivery routing entity supports one or more unique service environments, whereby one or more sub-controllers of the apparatus are configured to provide for selective access and configuration by authorized users for the one or more unique service environments.

11. An apparatus according to claim 10, further comprising:
    one or more session controllers, natively coupled to the common switch fabric via one or more native fabric session controller interfaces, configured to initiate, in response to the request, one or more content streaming sessions,
    wherein the at least one controller is further configured to cause the content to be transmitted as part of the one or more content streaming sessions based on the one or more determined paths.

12. An apparatus according to claim 11, wherein the common switch fabric provides non-blocking connectivity between the one or more disk arrays and the one or more session controllers.

13. An apparatus according to claim 11, further comprising:
a streamer natively coupled to the common switch fabric and configured to encode the content before transmission as part of the one or more content streaming sessions.

14. An apparatus according to claim 10, wherein the one or more paths are determined based on information relating to one or more of available bandwidth, load balancing, and shortest delivery path.

15. An apparatus according to claim 10, wherein the apparatus is a multi-chassis apparatus including a first chassis supporting the one or more disk arrays and a second chassis supporting the common switch fabric.

16. An apparatus according to claim 15, wherein the one or more disk arrays are natively coupled to the common switch fabric via at least one optical interconnect.

17. An apparatus according to claim 10, further comprising:
a chassis configured to support a plurality of removable blades; and
at least one removable blade including the one or more disk arrays,
wherein the common switch fabric is integrated into a plane of the chassis and configured to natively couple to the one or more disk arrays through one or more physical plug-in interfaces.

18. An apparatus according to claim 17, wherein the plurality of removable blades are hot pluggable and hot swappable.

19. An apparatus according to claim 10, wherein resources of the apparatus are logically partitioned into a plurality of unique service environments and the at least one controller is further configured to determine the one or more paths to prevent resource contention between the plurality of unique service environments.

20. An apparatus according to claim 10, wherein the content relates to one of video content, targeted advertisement content, gaming content, or deep packet inspection content.

* * * * *